Figure 1:
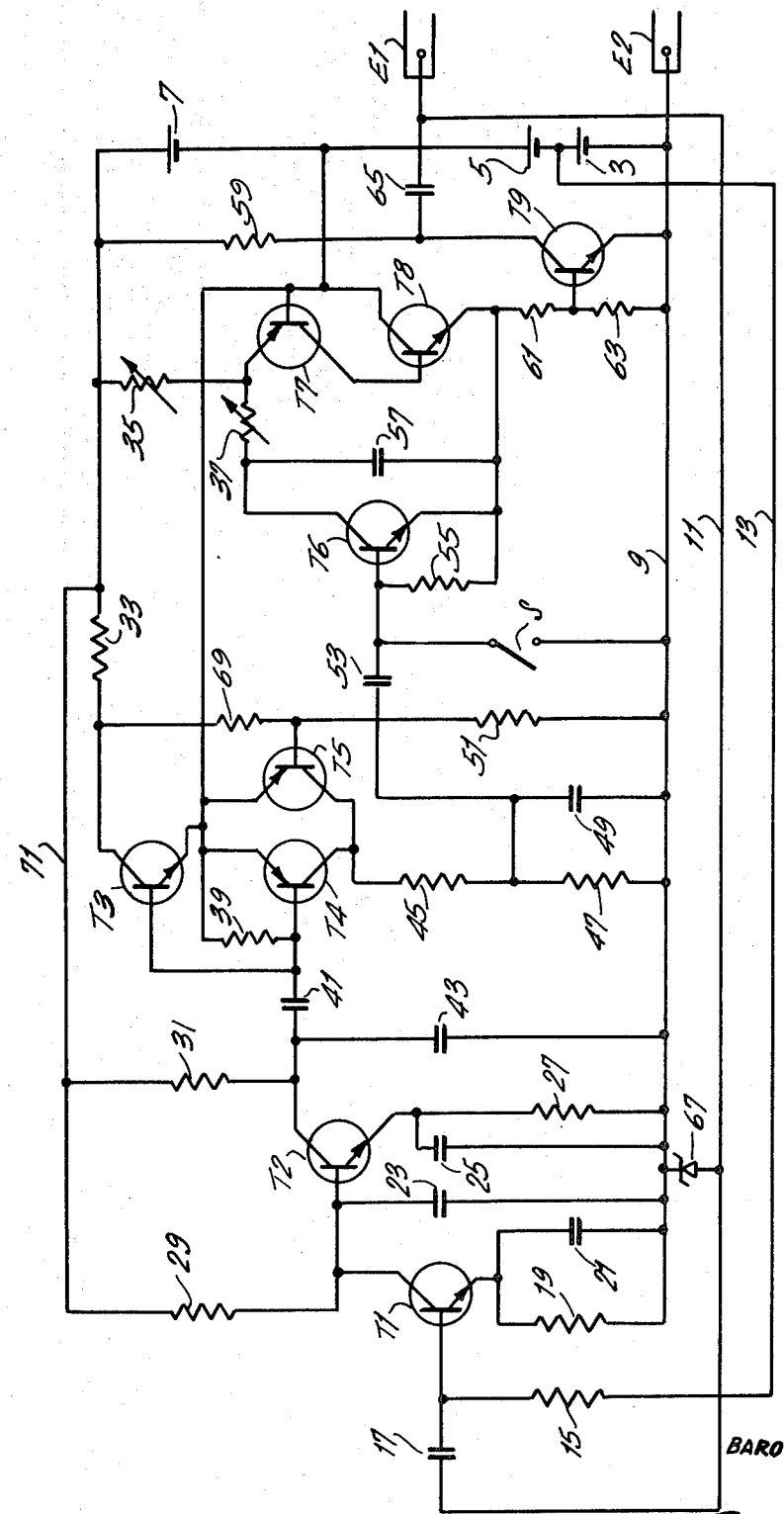

PATENTED JUL 4 1972 3,674,015

INVENTOR.
BAROUH V. BERKOVITS

Noble J. Williams
ATTORNEY

United States Patent
Berkovits

[15] 3,674,015
[45] July 4, 1972

[54] RATE DISCRIMINATORY ELECTROCARDIOGRAPHIC MONITORING SYSTEM

[72] Inventor: Barouh V. Berkovits, Newton Highlands, Mass.

[73] Assignee: American Optical Corporation, Southbridge, Mass.

[22] Filed: March 4, 1970

[21] Appl. No.: 16,478

Related U.S. Application Data

[62] Division of Ser. No. 727,129, April 11, 1968, Pat. No. 3,528,428.

[52] U.S. Cl. .................................................... 128/2.06 F
[51] Int. Cl. .................................................... A61f 5/04
[58] Field of Search .................... 128/419 P, 2.05 P, 2.06 A, 128/2.06 F, 2.06 R

[56] References Cited

UNITED STATES PATENTS

| | | | |
|---|---|---|---|
| 3,135,264 | 6/1964 | Tischler et al. | 128/2.06 F |
| 3,174,478 | 3/1965 | Kahn | 128/2.06 F |
| 3,384,075 | 5/1968 | Mitchell | 128/2.06 F |
| 3,352,300 | 11/1967 | Rose | 128/2.06 A |

*Primary Examiner*—William E. Kamm
*Attorney*—William C. Nealon, Noble S. Williams and Robert J. Bird

[57] ABSTRACT

A demand pacer which provides electrical heart-stimulating impulses in the absence of natural heartbeats. In a pacer of this type, if the natural heartbeat detector is erroneously triggered, it is possible for impulses to be inhibited when they are actually needed. Erroneous operation of the detector in the invention is partially prevented by tuning it to the dominant frequencies in the electrical signal which is generated as a result of a localized ventricular depolarization. These frequencies, however, are relatively close to 60 Hz, and thus 60 Hz stray signals might erroneously cut off the generation of impulses. For this reason, a capacitor charging circuit is provided in the detecting circuit. All input signals are processed so that the capacitor is fed by unipolar pulses. Pulses occuring at a 120 Hz rate (from the processing of stray 60 Hz signals) occur so rapidly compared to the discharge time constant of the capacitor circuit that the voltage across the capacitor does not change appreciably. Heartbeat signals, on the other hand, occuring at the much slower rate of approximately 72 per minute, allow the capacitor to discharge sufficiently after each charging pulse such that a large pulsating signal is developed across the capacitor. It is each pulsating signal which shuts off the generation of an impulse. In the presence of 60 Hz stray signals, the pacer functions in its continuous mode.

4 Claims, 2 Drawing Figures

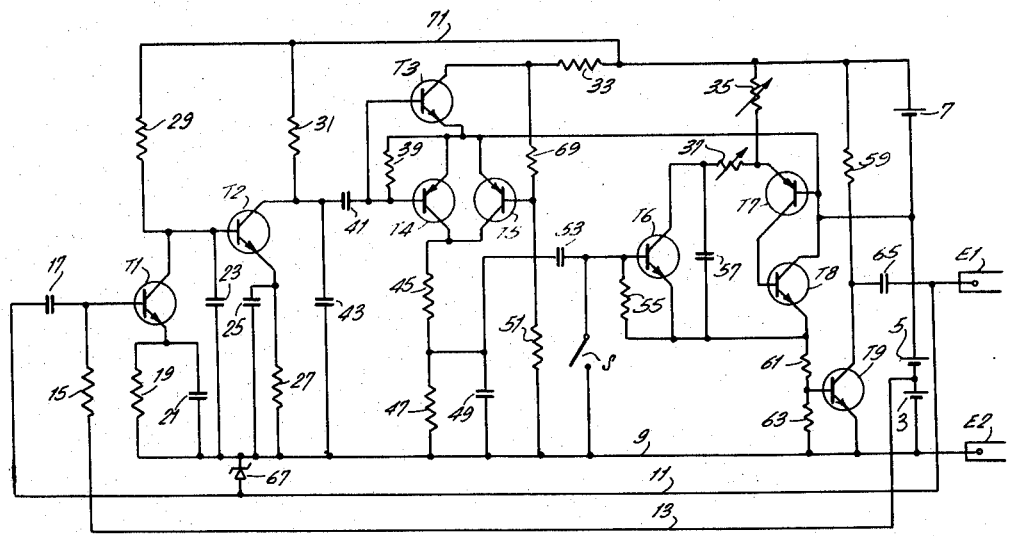

RATE DISCRIMINATORY ELECTROCARDIOGRAPHIC MONITORING SYSTEM

This is a division of my co-pending application filed Apr. 11, 1968 entitled "Demand Pacer," bearing Ser. No. 727,129 and U.S. Pat. No. 3,528,428.

This invention relates to demand pacers, and more particularly to such a pacer which is not susceptible to erroneous inhibition of the generation of one or more impulses.

In my U.S. Pat. No. 3,345,990 issued Oct. 10, 1967, there is disclosed a demand pacer which provides electrical heart-stimulating impulses to the patient's heart only in the absence of natural heartbeats. If only a single natural heartbeat is absent, only a single electrical impulse will be provided. If more than one natural heartbeat is missing, an equal number of electrical impulses will be provided. No matter how many electrical stimuli are generated, they occur at essentially the same time spacing from each other and from the last natural heartbeat as would be the case if they were all natural heartbeats.

The apparatus is arranged normally to generate electrical impulses at predetermined time intervals approximately at the rate of the natural heartbeats. Upon detection of a natural heartbeat, the next electrical stimulus which would otherwise be generated is inhibited. At the same time, the apparatus restarts its timing cycle so that the next electrical impulse will be generated (if needed) after the predetermined time interval has elapsed, starting with the heartbeat just detected. The result is an overall "integrated" operation, i.e., a mutually exclusive cooperation of natural heartbeats and stimulating impulses.

But just as a natural heartbeat can inhibit the generation of an impulse, so can other signals. The above-identified invention, as well as the subject invention, are equally applicable to implantable pacemakers and external pacers. In the latter case, the additional hospital equipment used in conjunction with the pacer may generate signals strong enough such that they are picked up by the pacer and treated as the signals which are detected as the result of a natural heartbeat. Similarly, a patient equipped with an implantable pacer may be in an environment where there are strong electrical signals, such as stray 60 Hz energy. In both cases, the "noise" signals may falsely inhibit the generation of artificial impulses if the pacer treats the noise signals as those detected as a result of natural heartbeats.

It is a principal object of this invention to safeguard against the false inhibition of the generation of one or more impulses as a result of undesired signals.

It is generally recognized by those skilled in the art that it is preferable to distinguish the QRS complex in an electrocardiogram from the P and T waves for the purpose of detecting a natural heartbeat. Actually, with respect to implantable pacers it is the cellular electrogram in the vicinity of the electrodes which is important, not the skin electrocardiogram, since the pacer responds to the electrical signals generated by the cells in the vicinity of the electrodes. The cellular electrogram is generally considerably different from the skin electrocardiogram. The latter is the integral of all the cellular electrograms generated by a beating action of the heart. Because the various cells generate their signals at different times during each heartbeat, the integral (electrocardiogram) is in many respects dissimilar from an individual cellular electrogram. However, just as the electro-cardiogram exhibits a sharply rising R pulse so does the cellular electrogram. It is the sharply rising pulse of the electrogram which is the best indication of a natural heartbeat. Although references below are made to the QRS complex of an electrocardiogram, it must be borne in mind that with respect to the electrodes implanted in the patient's heart it is the sharply rising pulse of the cellular electrogram which is of importance. It has become the practice in the art to focus on the QRS complex of the electrocardiogram, rather than the individual cellular electrogram, primarily because the R wave in the electrocardiogram does for the most part correspond to the sharply rising pulse of the cellular electrogram.

It has been suggested in the prior art to provide a tuned circuit connected to the electrodes for distinguishing between the QRS complex on the one hand, and undesired signals on the other. These undesired signals fall into two main categories. First, there are the P and T waves of the electrocardiogram (or the non-step functions in the cellular electro-gram) which are not the best indications of a natural heartbeat and preferably should not be used to inhibit the pacer operation. Second, there may be stray signals present, especially stray 60 Hz signals. The dominant frequencies in the cellular electrogram, and more particularly those which pertain to the step function exhibited, are in the 20–30 Hz range. Although a filter may be provided to distinguish signals in this range, it is exceedingly difficult to provide a filter with sufficient discrimination so as to eliminate 60 Hz signals. With the use of such filters alone it is exceedingly difficult to completely cancel out the undesirable effects of stray 60 Hz signals, that is, such signals can turn off the pacer even in the absence of natural heartbeats.

In accordance with the principles of my invention, a switch is provided which when energized as a result of any natural heartbeat turns off the impulse generating mechanism for one cycle. If the switch is not energized, i.e., if the heart is not beating naturally, the impulse generating mechanism continues to function. The switch is fed by unipolar pulses, not alternating signals. The natural beating action of the heart causes these unipolar pulses to be fed to the switch at a typical rate of 72 per minute. Stray 60 Hz signals, after rectification, cause similar pulses to be fed to the switch at a rate of 120 per second. For proper operation of the device, the switch should be inhibited from operating by the latter signals.

The switch itself comprises a first resistor connected in series with a parallel combination of a second resistor and a capacitor which is AC-coupled to a transistor gate. Each current pulse delivered to the switch flows through the first resistor to charge the capacitor. When the pulse terminates, the capacitor discharges through the second resistor. If the only pulses fed to the switch arise from the natural heartbeats, the capacitor is fed charging pulses at a rate slightly faster than once per second. Between pulses, the capacitor discharges. The voltage swings across the capacitor are sufficient to turn on the transistor gate and to inhibit the heart-stimulating impulses. Consequently, each natural heartbeat results in the capacitor first charging and then discharging, and the swing is sufficient to inhibit the generation of the next impulse.

However, the 120 pulses per second which are fed to the capacitor as a result of the rectification of stray 60 Hz signals occur at so fast a rate that the capacitor is unable to discharge appreciably between pulses. Consequently, the capacitor remains charged to almost its peak value when stray 60 Hz signals are being detected. Since the voltage swing across the capacitor is negligible, and it is the swing, due to the AC coupling, which operates the transistor gate to turn off the impulse generating mechanism, it is seen that the mechanism is not turned off. The pacer operates in its free-running mode. Because the capacitor remains almost fully charged as long as the 60 Hz signals are being received, the pulses delivered to the capacitor as the result of natural heartbeats have no effect — the capacitor remains essentially fully charged even without these pulses. Thus, as long as the stray 60 Hz signals are being received, natural heartbeats have no effect on cutting off the pacer operation.

There is yet another type of undesirable signal which must be guarded against, namely, RF pulses. RF (sine wave) signals, if they are somehow extended to the pacer, keep the capacitor charged just as do 60 Hz stray signals. The greater the frequency of the stray signals, the greater the rate of the pulses delivered to the capacitor. There is even less time for the capacitor to discharge between pulses and the pacer operates in its free-running mode. However, there are many cases in which a single RF pulse is generated, e.g., with the turning on of the ignition of a car. A pulse of this type often occurs by itself and will therefore be sufficient to charge the capacitor, which would thereafter discharge, and in so doing inhibit the generation of a required impulse.

In accordance with the principles of my invention, narrow RF pulses of this type are ineffective to inhibit the generation of an impulse. It will be recalled that the capacitor charges through a first resistor. The time constant of the charging circuit is such that for a narrow pulse the capacitor does not appreciably charge by the time the pulse terminates, there is no voltage swing across the capacitor, and the pacer operation is unaffected.

Another aspect of the present invention pertains to the output, or impulse generating, stage of the pacer. It has become the practice in the art to provide a capacitor which is charged between impulses, the charge on which is used to generate each impulse as required. In accordance with the principles of my invention, such a capacitor is used for the same purpose. However, the capacitor is included in a circuit configuration in a way such that a number of advantages are achieved.

Between the two electrodes there is a series circuit comprising the capacitor and a transistor switch. Between impulses, the capacitor is charged to the magnitude of the battery included in the unit. In the prior art, in many cases the current impulse extended to the electrodes flowed through the battery. This is disadvantageous in that while the magnitude of the battery voltage may not change to too great an extent, the impedance of the battery can change. If the current impulse flows through the battery, its magnitude will change with time. But in my invention, the capacitor is always charged to the same voltage, and when it discharges the current does not flow through the battery. Instead, it flows through an essentially short-circuited transistor switch. Consequently, there is very little variation in the magnitude of the current impulses delivered to the electrodes.

The capacitor also serves in the capacity of a "booster stage." In a typical prior art pacer, approximately 90 percent of the energy dissipation results from the charging of the output capacitor, and its subsequent discharging. In the event an impulse is not required, the capacitor has been discharged through a dummy load. It is then recharged prior to the next cycle in preparation for an impulse if required. This is very wasteful in that during those periods when the patient's heart is functioning normally, the capacitor still dissipates 90 percent of the total energy even though there is no need for it. In my invention, however, once the capacitor is charged it remains charged until it is short-circuited through the transistor switch and the electrodes. Although the pacer includes numerous conducting transistors which operate even when the heart is beating normally, the transistor connecting the capacitor to the electrodes is normally non-conducting. It conducts only when it is necessary to provide an impulse to the heart. Consequently, the energy stored in the output capacitor is not dumped in those cycles when an impulse is not required. Instead, the capacitor remains charged until an impulse is required. The lower energy dissipation allows for a much longer life of the pacer, and a lengthening of the time period between pacer implantations.

The pacer of my invention also has a longer shelf life, that is, the batteries included in it do not wear down to too great an extent between manufacture and implantation. Recalling that the discharge circuit for the capacitor is through the electrodes, it is apparent that while the unit is on the shelf and the electrodes are open-circuited, the capacitor cannot discharge even with the transistor switch in the output circuit conducting during each cycle. Thus, the unit can be made to have a much longer shelf life.

It is a feature of my invention to distinguish between the QRS complex and the P and T waves in the detected heartbeat signal to control the inhibiting of a generated impulse.

It is another feature of my invention to provide a capacitor at the input of the impulse disabling circuit, the capacitor being charged by unipolar pulses, and discharging at the termination of each pulse, the discharge time constant of the capacitor being such that a voltage swing sufficient to inhibit the generation of an impulse is developed across the capacitor only as a result of pulses occuring at a rate in the neighborhood of the natural heartbeat rate.

It is another feature of my invention to charge the capacitor by the unipolar pulses through a resistor having a magnitude sufficient such that RF pulses charge the capacitor only negligibly.

It is still a further feature of my invention to provide a storage capacitor in series with the output electrodes and a transistor switch, the capacitor being charged between cycles from the battery supply, and being discharged only when the electrodes are interconnected and the transistor switch is turned on.

Figure 2:

Further objects, features and advantages of the invention will become apparent upon a consideration of the following detailed description in conjunction with the drawing, in which:

FIG. 1 is a schematic diagram of an illustrative embodiment of the invention; and FIG. 2 depicts an electrocardiogram produced by the heart during normal heartbeat action.

The pacer, exclusive of the frequency and rate discrimination circuits, can be best understood by first considering the circuitry to the right of switch S in FIG. 1. Capacitor 65 is initially charged by current flowing from batteries 3, 5 and 7 through resistor 59, terminals E1 and E2, and the patient's heart in a time much shorter than the interval between successive heartbeats. The magnitude of resistor 59 is low enough to permit rapid charging of capacitor 65 but high enough to prevent significant attenuation of the signal detected across terminals E1 and E2, these terminals being connected to the implanted electrodes. When transistor T9 is triggered to conduction, the capacitor discharges through it, current flowing from the capacitor through the collector-emitter circuit of the transistor, terminal E2, a cable to one electrode, the heart itself, the other electrode, and another cable back to terminal E1. The discharge of capacitor 65 through the electrodes constitutes the impulse to trigger the heartbeat if necessary. As soon as transistor T9 turns off, capacitor 65 charges once again in preparation for the next cycle. The capacitor serves simply as a source of current when an impulse is necessary. Capacitor 65 is not involved with the various timing sequences used to control the selective generation of impulses.

The capacitor always charges to the peak battery voltage. Because it discharges through an essentially short-circuited transistor switch, the magnitude of the impulses does not vary as the battery impedance increases with aging. Nor is there any waste of energy between manufacture and implantation — although transistor T9 is gated on during each cycle, as long as the electrodes are open-circuited capacitor 65 cannot discharge.

Capacitor 65 charges, as well as discharges, through the heart so that the net DC current through the electrodes from the pacer is zero. Otherwise, electrolytic processes in the heart cells could dissolve the electrodes.

Transistors T7 and T8, connected as shown, are the equivalent of a conventional silicon controlled rectifier. Both are normally non-conducting. When the emitter electrode of transistor T7 goes sufficiently positive, the transistors conduct and current flows through the emitter circuit of transistor T8. Current continues to flow until the potential at the emitter of transistor T7 drops below a predetermined value.

Transistor T9 is a simple current amplifier which is normally non-conducting. When transistor T8 conducts, however, the emitter current flowing through resistors 61 and 63 causes the potential at the base of transistor T9 to increase. At such a time transistor T9 is biased to conduction and capacitor 65 can discharge through it as described above.

The apparatus can be used in a free-running mode, that is, an impulse can be generated at a 72 pulse per minute rate, for example, independent of the occurrence of natural heartbeats. In such a case, switch S is closed and the base of transistor T6 is connected to the negative terminal of battery 3. Transistor T6 therefore remains in a cut-off condition. Pulses transmitted through capacitor 53 (to be described below) are shorted through the switch away from the transistor. Initially, capacitor 57 is discharged and transistors T7 and T8 are non-conducting. Current flows from batteries 3, 5 and 7 through resistors 35 and 37, capacitor 57, and resistors 61 and 63. The current through resistors 61 and 63 is insufficient to turn on transistor T9. As the capacitor charges, the junction of the capacitor and resistor 37 increases in potential. Thus the emitter of transistor T7 in creases in potential. Eventually the potential is sufficient to trigger the relaxation oscillator consisting of transistors T7 and T8. Capacitor 57 discharges through resistor 37 and these two transistors. At the same time current flows from batteries 3 and 5 through the collector-emitter circuit of transistor T8, and resistors 61 and 63. Transistor T9 conducts and capacitor 65 discharges through it to provide an impulse to the heart. As soon as capacitor 57 has discharged sufficiently and the potential of the emitter of transistor T7 has dropped to a low enough value, all of transistors T7, T8 and T9 turn off and the impulse is terminated. Capacitor 65 immediately recharges, and capacitor 57 starts charging once again in preparation for the next impulse.

The charging period of capacitor 57, that is, the interval between impulses, is determined by the magnitude of the capacitor, and the magnitudes of resistors 35, 37, 61 and 73. Resistors 37, 61 and 63 are very small in comparison to the magnitude of resistor 35. Consequently, it is the magnitude of resistor 35 which determines the inter-pulse interval. As the magnitude of resistor 35 is adjusted the rate of the impulses varies.

Similarly, it may be desirable to adjust the width of each impulse delivered to the heart. Capacitor 57 discharges through resistor 37 and transistors T7 and T8. The width of the impulse delivered by capacitor 65 is determined by the discharge time of capacitor 57, that is, the time period during which transistors T7 and T8 conduct and thereby turn on transistor T9. By varying the magnitude of resistor 37 the width of each impulse can be adjusted. In the case of an implantable pacer, the magnitudes of resistors 35 and 37 would be adjusted prior to implanting the apparatus in the patient.

When switch S is opened, i.e., in the case of a pacer required to operate in the demand mode, the same type of free-running operation would take place were there no input to the base of transistor T6 through capacitor 53. Transistor T6 would remain non-conducting and would not affect the charging of capacitor 57. However, with switch S open, pulses transmitted through capacitor 53 are not shorted through the switch away from the base-emitter circuit of transistor T6. With the switch open, each pulse transmitted through capacitor 53 to the base of transistor T6 causes the transistor to conduct. Capacitor 57 discharges through the collector-emitter circuit of the transistor. In such a case, the timing cycle is interrupted and the junction of capacitor 57 and resistor 37 does not increase in potential to the point where transistors T7 and T8 are triggered to conduction. When the apparatus is functioning as a "demand" pacer, each natural heartbeat causes a pulse to be transmitted through capacitor 53 to turn on transistor T6. Transistor T6 conducts to discharge capacitor 57 just prior to the time when capacitor 57 would trigger, and discharge through, transistors T7 and T8 to control the generation of an impulse.

After capacitor 57 has discharged through transistor T6, the transistor turns off. The capacitor then starts charging once again. The new cycle begins immediately after the occurrence of the last natural heartbeat so that the next impulse, if needed, will be generated immediately after the next natural heartbeat should have been detected were the heart functioning properly.

It is the function of the circuitry to the left of switch S to detect the step function of a cellular electrogram produced by a natural heartbeat, to the exclusion of other undesired signals, and in response thereto to apply a positive pulse to the base of transistor T6 for the purpose of interrupting the charging cycle of capacitor 57.

The natural beating action of the heart produces electrical signals which are characteristic of successive steps in the occurrence of each heartbeat. A heart beating in normal or sinus rhythm produces electrical signals conventionally identified as P, Q, R, S and T waves as shown in FIG. 2. As described above, such an electrocardiogram is the integral of many cellular electrograms recurring at different times. However, the R wave in the electrocardiogram, approximating a step function, is derived primarily from the individual step functions in the cellular electrograms and is characteristic of ventrical contraction in the heart. It is the R peaks which have been found to provide the most positive indication of a natural heartbeat. It has therefore become the practice in the art to distinguish between the QRS complex on the one hand, and the P and T waves on the other, for the purpose of detecting a natural heartbeat.

Using the techniques of frequency analysis, it can be shown that the R peak comprises frequency components primarily in the 20–30 Hz region. The P and T waves comprise for the most part lower frequency components. To avoid triggering of transistor T6 by P and T waves, various filters are provided in the circuit to filter out frequencies below 20 Hz. Of course, it is advantageous to provide additional filters to filter out frequencies above 30 Hz, and particularly 60 Hz frequency signals. Such filters are incorporated in the pacer depicted in FIG. 1, although it has been found that such filters are not totally effective in preventing the triggering of transistor T6 by 60 Hz stray signals. For this reason, while various filters are associated with amplifying stages T1 and T2, a rate discrimination circuit (including transistors T3, T4 and T5, resistors 45 and 47, and capacitors 49 and 53) is provided to prevent triggering of transistor T6 by 60 Hz stray signals. This rate discrimination circuit will be described below after the frequency discrimination circuit is first considered.

Transistor T1 is normally conducting, the emitter terminal of the transistor being connected through resistor 19 and conductor 9 to the negative terminal of battery 3, and the base of the transistor being connected through resistor 15 and conductor 13 to the positive terminal of the battery. The electrical signals picked up by the electrodes implanted in the patient's heart are coupled across capacitor 17 and resistor 15 in the base circuit of transistor T1. Signals of either polarity are amplified by transistor T1. The transistor is biased for class A operation because the polarity of the detected signal may be of either type depending on the manner in which the electrodes are implanted.

It should be noted that Zener diode 67 bridges input conductors 9 and 11. It is possible that very high voltages can appear across the electrodes. For example, if defibrillation equipment is used, a very high voltage may be applied to the patient's heart. To avoid damage to the pacer circuitry, the large voltage signals are short-circuited across conductors 9 and 11. Zener diode 67 conducts in the forward direction (for voltages above a few tenths of a volt) as well as for voltages in the reverse direction which are above the breakdown potential of ten volts.

Capacitor 17 and resistor 15 emphasize the step function in the cellular electrogram. These two elements comprise a differentiator which emphasizes the frequency components above approximately 20 Hz. For such signals, the voltage drop across resistor 15 is appreciable and the input to transistor T1 is relatively large. For lower frequency signals, however, the voltage drop across capacitor 17 is much greater, and a smaller input signal is applied across the base-emitter junction of transistor T1.

Resistor 19 and capacitor 21 in the emitter circuit of transistor T1 serve a similar function. The impedance of the parallel circuit increases as frequency decreases. The emitter impedance provides negative feedback for the transistor, and the overall gain of the transistor decreases as the frequency decreases.

The amplified signal at the collector of transistor T1 is applied across the base-emitter junction of transistor T2, this transistor also being biased for class A operation. Transistor T2 further amplifies the detected signals. Capacitor 25 and resistor 27 in the emitter circuit of transistor T2 serve the same function as resistor 19 and capacitor 21 in the emitter circuit of transistor T1. This third differentiator further limits the low frequency response of the detecting circuit to discriminate against the P and T waves and any other frequencies well below 20 Hz.

Resistor 29 and capacitor 23 serve as an integrator to reduce high frequency noise components well above 30 Hz. The higher the frequency, the lower the impedance of capacitor 23, the smaller the overall collector impedance of transistor T1, and the lower the gain of the stage. Resistor 31 and capacitor 43 in the collector circuit of transistor T2 serve the same function. Actually, these four elements serve to attenuate frequencies well above 60 Hz and have little effect on 60 Hz signals. In the illustrative embodiment of the invention the rate discrimination stage distinguishes 60 Hz stray signals from desired signals.

AC signals at the collector of transistor T2 are coupled through capacitor 41 to the base of transistor T3 and the base of transistor T4. The overall gain characteristic of stages T1 and T2, from terminals E1 and E2 to the collector of transistor T2 and conductor 9, is such that signals in the 20-30 Hz region are amplified to the greatest extent. The gain curve falls off very rapidly below 20 Hz such that the frequency components characteristic of the P and T waves are not amplified sufficiently for turning on transistors T3 and T4. For frequency components above 30 Hz, the gain for 60 Hz signals is only slightly less than the maximum gain. However, for signals considerably higher, e.g., above 150 Hz, the gain is low enough to prevent false operation of transistors T3 and T4.

If transistors T3 and T4 require a signal of approximately 1 volt to conduct, and the maximum gain of stages T1 and T2 is above 50, it is apparent that 20 mv signals in the 20-30 Hz region at the electrodes can trigger transistors T3 and T4 to conduction. The 20-30 Hz components in the electrical signal generated by the beating of the heart in the vicinity of the electrodes is typically above 20 mv. The frequency components characteristic of the P and T waves are not only 2-3 times smaller in magnitude than those characteristic of the R wave, but since the gain of stages T1 and T2 in the region around 5 Hz is only a fraction of the maximum gain, these signals do not trigger transistors T3 and T4 to conduction.

The rate discriminator stage includes three transistors T3, T4 and T5 which collectively comprise a bi-phase switch having two functions. First, the switch serves to provide unipolar current pulses to charge capacitor 41. However, the switch is not a true rectifier because of its second function. This function is to provide unipolar pulses of constant magnitude independent of the amplitude of input signals above a threshold value. Any signal through capacitor 41, either positive or negative, which exceeds a threshold value (typically, 1 volt) results in a unipolar current pulse of predetermined magnitude being fed through resistor 45 to charge capacitor 49.

The emitter of transistor T4 is connected to the positive terminal of battery 5, while the base of the transistor is connected through bias resistor 39 to the same potential. Transistor T4 is normally non-conducting. However, when a negative signal is transmitted through capacitor 41 the transistor turns on and current flows from battery 5 through the emitter-collector circuit of the transistor, resistor 45, and the parallel combination of resistor 47 and capacitor 49. The capacitor thus charges toward a maximum voltage determined by batteries 3 and 5. If the emitter-collector circuit of the transistor is considered to have negligible impedance, the charging current is determined solely by the magnitude of the batteries, and the magnitudes of elements 45, 47 and 49. The magnitude of the negative input signal is of no moment. As long as it is above the threshold value necessary for controlling the conduction of transistor T4, a current pulse of predetermined magnitude will be delivered to charge capacitor 49.

A positive signal transmitted through capacitor 41, on the other hand, has no effect on transistor T4. However, it does cause transistor T3 to conduct, current flowing from battery 7 through resistor 33 and the collector-emitter circuit of transistor T3. It is necessary that the positive signal transmitted through capacitor 41 also result in a unipolar pulses of the same polarity to charge capacitor 49. The collector output of transistor T3 cannot be used for this purpose because it drops in potential when transistor T3 conducts. For this reason, phase inverter T5 is provided. While the emitter of this transistor is connected to the negative terminal of battery 7, the base of the transistor is connected to the junction of resistors 51 and 69. Normally the transistor is non-conducting. However, when transistor T3 conducts and the collector voltage drops, so does the base potential of transistor T5. At this time transistor T5 conducts, current flowing from the positive terminal of battery 5 through the emitter-collector circuit of transistor T5 to resistor 45. It is thus seen that any changing signal transmitted through capacitor 41 above a threshold value causes a unipolar pulse to be delivered to the charging circuit.

Consider for the moment unipolar pulses delivered by either transistor T4 or transistor T5, or both of them, occurring at a very slow rate. Each current pulse causes capacitor 49 to charge, current flowing through resistor 45 and the capacitor. (Some of the current flows through resistor 47 but capacitor 49 keeps charging and the voltage across it keeps increasing). When the pulse terminates, capacitor 49 starts discharging through resistor 47. Assuming that each charging pulse is sufficient to fully charge capacitor 49, the potential across the capacitor will equal the sum of the magnitudes of batteries 3 and 5, multiplied by the voltage divider ratio of resistors 47 and 45 (less any drop across transistor T4). (The exception of narrow RF input pulses will be described below.) When each unipolar pulse terminates, capacitor 49 starts discharging through resistor 47. If the capacitor fully discharges by the time the next charging pulse is delivered, the capacitor will then recharge to the maximum voltage, after which it will fully discharge once again. The potential across capacitor 49 is AC-coupled through capacitor 53 to the base of transistor T6. Each charging pulse increases the potential across capacitor 49 from zero to the maximum voltage. The positive step is sufficient to cause transistor T6 to conduct, thereby discharging capacitor 57 and inhibiting the next impulse which would otherwise have been generated.

Consider now charging pulses which occur at a faster rate, e.g., at a rate of 72 per minute which is expected as a result of natural heartbeats. Each charging pulse charges capacitor 49 to the maximum voltage. The capacitor then starts to discharge through resistor 47 but before the discharge is complete another charging pulse occurs. The capacitor immediately charges to the maximum voltage and then starts to discharge once again. The capacitor never fully discharges, but the minimum voltage across it (that at the end of the discharge cycle when the next charging pulse is received) is low enough such that the increase in the capacitor voltage with the occurrence of each charging pulse is still sufficient to trigger transistor T6. Consequently, each charging pulse which results from a natural heartbeat inhibits the generation of an impulse.

Consider now the effect of 60 Hz signals on the circuit. If a stray 60 Hz signal is applied to the base of transistor T3 and the base of transistor T4, each of these transistors conducts during each cycle, transistor T3 for some time during the positive half-cycle and transistor T4 for some time during the negative half-cycle. Consequently, charging pulses are delivered to capacitor 49 at the rate of 120 per second. This is a rate considerably greater than 72 per minute. Each pulse fully charges capacitor 49 and the next pulse is delivered before the capacitor has had an opportunity to discharge to any meaningful extent. Consequently, although each pulse fully charges the capacitor, the increase in the capacitor voltage is negligible because the capacitor voltage never decreases much below the maximum potential. Consequently, steps of negligible magnitude are transmitted through capacitor 53 to the base of transistor T6. This transistor requires a signal of approximately 0.5 volts for conduction, and the step functions delivered through capacitor 53 are well below this value as the result of the unipolar pulses occurring at a rate of 120 per second.

In the illustrative embodiment of the invention, activations of transistor T3 or T4 at a rate above 40 per second (an interactivation period of 25 milliseconds) are sufficient to prevent appreciable discharge of capacitor 49 and the triggering of transistor T6. It will be seen that should any 60 Hz signals, or signal of any higher frequency, be present in the circuit, step functions of insufficient magnitude to trigger transistor T6 are transmitted through capacitor 53. Transistor T6 remain nonconducting and the pacer operates in its free-running mode. Even if there are natural heartbeats at this time, they have no effect. Each natural heartbeat causes a charging pulse to be delivered to capacitor 49, but it has no effect since the capacitor is at all times charged to almost its peak value. Only in the absence of undesirable high frequencies does the capacitor have an opportunity to discharge prior to the delivery of a current pulse resulting from a natural heartbeat. It is only at this time that each natural heartbeat results in the conduction of transistor T6 and the inhibiting of an impulse. In effect, resistors 45 and 47, and capacitor 49, can be thought of as a high inertia switch. This switch cannot respond to beats above a rate of 40 per second. Any repetitive signal above 40 per second is ineffective to de-activate the impulse generating circuit.

Of course, during the time that stray 60 Hz signals, or other undesirable signals, are present, the pacer operates in its free-running mode along with the natural beating of the patient's heart. This may be disadvantageous, but it is far better than allowing the pacer to cease functioning at all — a disastrous condition if at the particular time the patient's heart has stopped functioning.

While very high frequency signals have the same effect on capacitor 49 as 60 Hz signals, there is one type of signal which is not prevented from falsely operating transistor T6 by the lack of discharge of capacitor 49. Specifically, single pulses of very narrow width can cause either of transistors T3 or T4 to conduct and a charging pulse to be delivered to capacitor 49. If capacitor 49 is discharged at this time (as it would be before the end of each cycle) the positive step across capacitor 49 can falsely trigger transistor T6. To preclude this possibility, resistor 45 is provided. Although each charging pulse causes a rapid rise in potential across capacitor 49, the rise is not a perfect step function because resistor 45 increases the charging time constant. With a very narrow pulse, by the time capacitor 49 has begun to charge appreciably, the pulse terminates. Consequently, capacitor 49 does not charge sufficiently to trigger transistor T6.

Transistors T1 and T2 serve a different function than transistors T3, T4 and T5. The first two transistors, together with the various differentiators and integrators connected to them, serve as a frequency discriminator. Although higher frequencies are somewhat attenuated, it is the attenuation of the lower frequencies (below 20 Hz) which is of the utmost importance. By attenuating these signal frequencies and distinguishing between the different waves in the myocardial signal, it is possible to prevent triggering of transistor T6 by P and T waves. Although the frequency discrimination circuit attenuates signals below 20 Hz, this should not be confused with beats at a 72 per minute rate. It is the emphasis on signal frequencies in the 20–30 Hz region which insures that beats at a 72 per minute rate appear at the base of transistor T3 and the base of transistor T4 as a result of the R waves to the exclusion of other signals. As far as signals transmitted through capacitor 41 are concerned, it is more convenient to analyze the operation of the pacer in terms of activation rates. The frequency components in any particular signal are not determinative once the signal has been transmitted through capacitor 41. From that point on, the important consideration is the number of activations of either transistor T3 or T4 during any given period of time. Since for any signal the bi-phase switch delivers a current pulse of predetermined magnitude to the capacitor charging circuit, it is the rate discrimination circuit which prevents cancellation of the pacer stimuli by competitive sine wave interference or any other interference from signals occurring at a rate greater than a minimum value. In the illustrative embodiment of the invention, interference is prevented for all signals occurring at a rate greater than 40 per second.

In a practical embodiment of this invention, the components of the described apparatus can have the following values:

Batteries:
| | |
|---|---|
| 3 | 1.4 volts |
| 5, 7 | 2.8 volts |

Transistors:
| | |
|---|---|
| T1, T2, T3, T6, T8, T9 | 2N4384 |
| T4, T5, T7 | 2N4413 |

Resistors:
| | |
|---|---|
| 15 | 220K |
| 19 | 470K |
| 29 | 2.2M |
| 31, 39 | 1M |
| 27 | 680K |
| 33 | 2.7M |
| 45, 47, 51 | 330K |
| 69 | 3M |
| 55 | 1.5M |
| 35 | 8.2M |
| 37 | 3K |
| 61, 63 | 10K |
| 59 | 33K |

Capacitors:
| | |
|---|---|
| 21 | .47uf |
| 23, 41 | .0068uf |
| 25 | .68uf |
| 43 | .0047uf |
| 49 | .047uf |
| 53 | .022uf |
| 57 | .1uf |
| 65 | 22uf |

Zener diode:
| | |
|---|---|
| 67 | UZ812(10 volts) |

Although the invention has been described with reference to a particular embodiment, it is to be understood that the embodiment is merely illustrative of the application of the principles of the invention. For example, while in the illustrative embodiment of the invention each natural heartbeat causes an impulse to be inhibited, it is possible to provide for each natural heartbeat to trigger transistors T7 and T8 such that an impulse will be provided simultaneously with the natural heartbeat. It is also possible to use the frequency and rate discrimination stages of the monitoring system in the illustrative embodiment of the invention in other electrocardiographic applications, or even in altogether different systems where it is necessary to carefully analyze a detected signal with reference to a predetermined signal. Thus, it is to be understood that numerous modifications may be made in the illustrative embodiment of the invention and other arrangements may be devised without departing from the spirit and scope of the invention.

What is claimed is:

1. A monitoring system for determining if the time interval between any two successive waveforms in a series of repetitive waveforms is greater than a minimum time interval comprising means for detecting each of the successive waveforms in said series of repetitive waveforms, said detecting means including frequency discrimination means for making said detecting means insensitive to pre-selected frequency components in said repetitive waveforms, means responsive to each detection of a waveform by said detecting means for producing a unipolar current pulse, a capacitor, means for applying each unipolar current pulse to said capacitor for charging said capacitor to a fixed value responsive to each detection of a waveform, means for discharging said capacitor following the application thereto of each unipolar current pulse, and means responsive to an instantaneous rise in potential greater than a predetermined value across said capacitor simultaneously with the application thereto of a unipolar current pulse for indicating that the time interval which elapsed after the last detected waveform exceeds said minimum time interval.

2. A monitoring system in accordance with claim 1 wherein said minimum time interval is greater than one-sixtieth second.

3. A monitoring system in accordance with claim 2 wherein said current pulse applying means includes means for preventing a rise in potential across said capacitor which exceeds said predetermined value responsive to the width of a detected waveform being less than a minimum width.

4. A monitoring system in accordance with claim 1 wherein said series of waveforms consists of waveforms in an electrocardiographic signal and said minimum time interval is intermediate the normal time intervals between successive natural heartbeats and a time interval of one-sixtieth second.

* * * * *